(12) United States Patent
Miyazato et al.

(10) Patent No.: US 11,772,630 B2
(45) Date of Patent: Oct. 3, 2023

(54) CONTROL DEVICE FOR HYBRID VEHICLE AND CONTROL METHOD FOR HYBRID VEHICLE

(71) Applicant: TOYOTA JIDOSHA KABUSHIKI KAISHA, Aichi-ken (JP)

(72) Inventors: Yoshiaki Miyazato, Shizuoka-ken (JP); Daiki Yokoyama, Gotemba (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 98 days.

(21) Appl. No.: 17/541,135

(22) Filed: Dec. 2, 2021

(65) Prior Publication Data
US 2022/0176941 A1 Jun. 9, 2022

(30) Foreign Application Priority Data
Dec. 3, 2020 (JP) .................................. 2020-201252

(51) Int. Cl.
*B60W 20/13* (2016.01)
*B60W 20/12* (2016.01)
(Continued)

(52) U.S. Cl.
CPC ............ *B60W 20/13* (2016.01); *B60W 10/06* (2013.01); *B60W 10/08* (2013.01); *B60W 20/12* (2016.01);
(Continued)

(58) Field of Classification Search
CPC ...... B60W 20/13; B60W 10/06; B60W 10/08; B60W 20/12; B60W 2510/244; B60W 2710/06; B60W 2710/08; B60W 2556/50; B60W 2710/244; B60W 10/26; B60W 10/04; B60W 20/00
(Continued)

(56) References Cited

U.S. PATENT DOCUMENTS 5,815,824 A * 9/1998 Saga ..................... B60W 20/00
180/65.245
6,487,477 B1 * 11/2002 Woestman ............ B60W 10/08
340/439
(Continued)

FOREIGN PATENT DOCUMENTS

DE 102014119373 A1 * 7/2015 ............ B60W 20/13
JP H1115651 A 1/1999

*Primary Examiner* — Sizo B Vilakazi
*Assistant Examiner* — Brian R Kirby
(74) *Attorney, Agent, or Firm* — HAUPTMAN HAM, LLP

(57) ABSTRACT

A control device for a hybrid vehicle includes a processor being configured to: set a target state of charge of the battery; control the internal combustion engine and rotating electric machine and charging and discharging of the battery to make the hybrid vehicle run, so that a state of charge of the battery becomes the target state of charge; and, in a case where a point inside a restricted region where operation of the internal combustion engine is restricted is set as a destination or a waypoint, set the target state of charge to a lower value when an estimated time of arrival at the destination or the waypoint is a point of time outside a restricted time period when operation of the internal combustion engine is restricted in the restricted region than when the estimated time of arrival is a point of time inside the restricted time period.

9 Claims, 5 Drawing Sheets

(51) Int. Cl.
    *B60W 10/06* (2006.01)
    *B60W 10/08* (2006.01)
(52) U.S. Cl.
    CPC ... *B60W 2510/244* (2013.01); *B60W 2710/06* (2013.01); *B60W 2710/08* (2013.01)
(58) Field of Classification Search
    USPC .......................................... 701/22; 180/127
    See application file for complete search history.

(56) References Cited

U.S. PATENT DOCUMENTS

| | | | | |
|---|---|---|---|---|
| 8,180,509 | B2* | 5/2012 | Grider | B60W 10/06 701/22 |
| 9,889,764 | B2* | 2/2018 | Yang | B60L 53/62 |
| 10,486,689 | B2* | 11/2019 | Farrell | B60W 30/182 |
| 10,583,827 | B2* | 3/2020 | Morisaki | B60W 30/06 |
| 2002/0096886 | A1* | 7/2002 | Schmitz | B60K 6/46 290/40 C |
| 2003/0015358 | A1* | 1/2003 | Abe | B60W 50/0097 903/918 |
| 2003/0078707 | A1* | 4/2003 | Shioda | B60L 50/16 903/917 |
| 2006/0173593 | A1* | 8/2006 | Anderson | F02N 11/0833 701/1 |
| 2007/0294026 | A1* | 12/2007 | Schirmer | B60W 20/12 340/995.19 |
| 2009/0101421 | A1* | 4/2009 | Oyobe | B60L 53/14 180/65.265 |
| 2010/0131139 | A1* | 5/2010 | Sakai | B60K 6/46 903/903 |
| 2010/0235016 | A1* | 9/2010 | Grider | B60W 10/06 701/2 |
| 2010/0274422 | A1* | 10/2010 | Schrey | G01C 21/3461 903/903 |
| 2011/0190968 | A1* | 8/2011 | Fleming | B60L 58/13 701/22 |
| 2014/0303820 | A1* | 10/2014 | Aoki | B60W 10/08 180/65.265 |
| 2015/0127203 | A1* | 5/2015 | Kashiba | B60W 10/24 701/22 |
| 2015/0291145 | A1* | 10/2015 | Yu | B60W 20/13 180/65.23 |
| 2017/0174204 | A1* | 6/2017 | Jones | B60W 50/0097 |
| 2019/0047572 | A1* | 2/2019 | Bennett | B60K 6/46 |
| 2019/0126907 | A1* | 5/2019 | Park | B60L 58/13 |
| 2019/0390970 | A1 | 12/2019 | Cha et al. | |
| 2020/0180599 | A1 | 6/2020 | Kang et al. | |
| 2021/0061254 | A1* | 3/2021 | Hashizume | B60W 20/40 |
| 2021/0403010 | A1* | 12/2021 | Symanow | B60R 16/03 |

* cited by examiner

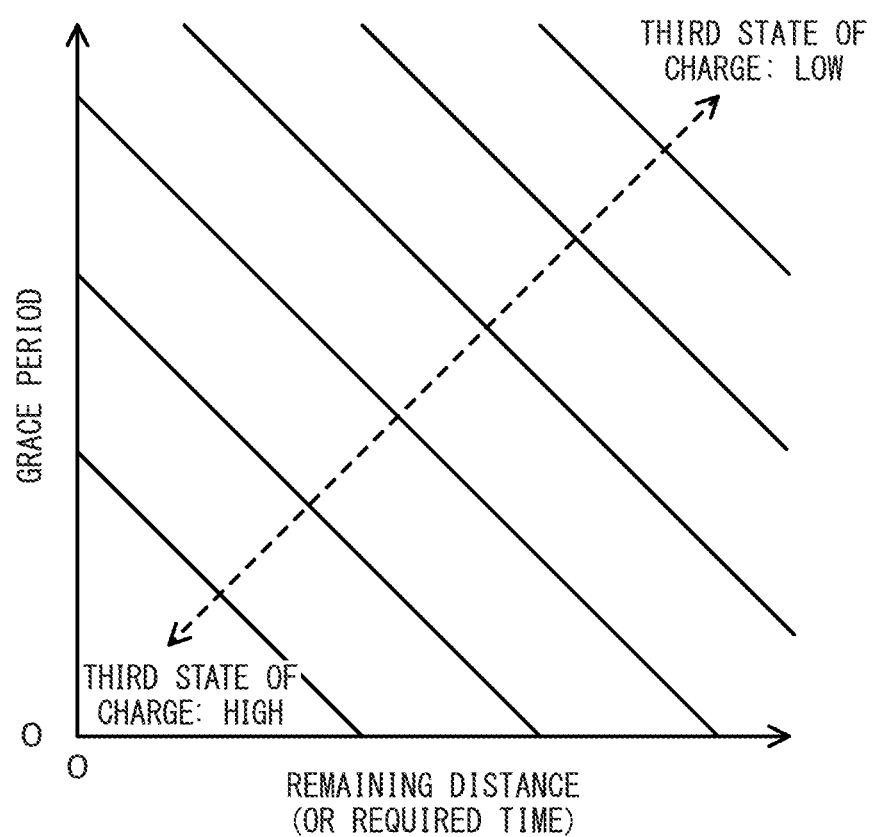

CONTROL DEVICE FOR HYBRID VEHICLE AND CONTROL METHOD FOR HYBRID VEHICLE

RELATED APPLICATIONS

The present application claims priority of Japanese Patent Application No. 2020-201252 filed Dec. 3, 2020, the disclosure of which is hereby incorporated by reference herein in its entirety.

FIELD

The present disclosure relates to a control device for a hybrid vehicle and a control method for a hybrid vehicle.

BACKGROUND

Japanese Unexamined Patent Publication No. 11-015651 discloses a control system of vehicle-mounted equipment detecting a current position and current time of a hybrid vehicle and applying a specific control program when the current position is inside a restricted region and the current time is inside a restricted time period. Specifically, this patent literature discloses the case where the restricted region is a region where the amount of noise or amount of exhaust gas of the hybrid vehicle is desired to be restricted and the specific control program is a drive power control program for making a vehicle run by mainly the drive power of an electric motor.

SUMMARY

Among restricted regions where driving of internal combustion engines is restricted, there are restricted regions of variable time period types where operation of internal combustion engines is restricted for only predetermined restricted time periods. If a restricted region of such a variable time period type is present nearby, if maintaining the state of charge of the battery of the hybrid vehicle at a relatively high value at all times considering driving through the restricted region during the restricted time period, the distance by which the vehicle can be driven in the EV mode ends up being reduced, so the fuel efficiency is liable to deteriorate.

The present disclosure was made focusing on such a problem and has as its object to keep a state of charge of battery of a hybrid vehicle from being maintained at an unnecessarily high value while managing the state of charge of a battery to a suitable state of charge considering a restricted time period of a restricted region.

To solve the above problem, according to one aspect of the present disclosure, there is provided a control device for controlling a hybrid vehicle equipped with an internal combustion engine, a battery storing electric power generated utilizing drive power of the internal combustion engine, and a rotating electric machine driven by supply of one or both of electric power generated using drive power of the internal combustion engine and electric power stored in the battery. The control device comprises a processor being configured to: set a target state of charge of the battery; and control the internal combustion engine and rotating electric machine and charging and discharging of the battery to make the hybrid vehicle run so that a state of charge of the battery becomes a target state of charge; and, in a case where a point inside a restricted region where operation of the internal combustion engine is restricted is set as a destination or a waypoint, set the target state of charge to a lower value when an estimated time of arrival at the destination or the waypoint is a point of time outside a restricted time period when operation of the internal combustion engine is restricted in the restricted region than when the estimated time of arrival is a point of time inside the restricted time period.

Further, according to another aspect of the present disclosure, there is provided a control method for a hybrid vehicle provided with an internal combustion engine, a battery storing electric power generated utilizing drive power of the internal combustion engine, and a rotating electric machine driven by supply of one or both of electric power generated using drive power of the internal combustion engine and electric power stored in the battery, in which control method for a hybrid vehicle, in a case where a point inside a restricted region where operation of the internal combustion engine is restricted is set as a destination or a waypoint, the method sets a target state of charge to a lower value when an estimated time of arrival at the destination or the waypoint is a point of time outside a restricted time period where operation of the internal combustion engine is restricted in the restricted region than when the estimated time of arrival is a point of time inside the restricted time period and controls the internal combustion engine and rotating electric machine and charging and discharging of the battery to make the hybrid vehicle run so that a state of charge of the battery becomes the target state of charge.

According to these aspects of the present disclosure, it is possible to keep a state of charge of a battery of a hybrid vehicle from being maintained at an unnecessarily high value while managing the state of charge of the battery at a suitable state of charge considering a restricted time period of a restricted region.

BRIEF DESCRIPTION OF DRAWINGS

FIG. 7 is a map for setting a mode switching state of charge based on a remaining distance or required time from a current position to a restricted region and a grace period from a current time to a starting time of a restricted time period.

DESCRIPTION OF EMBODIMENTS

Figure 1:
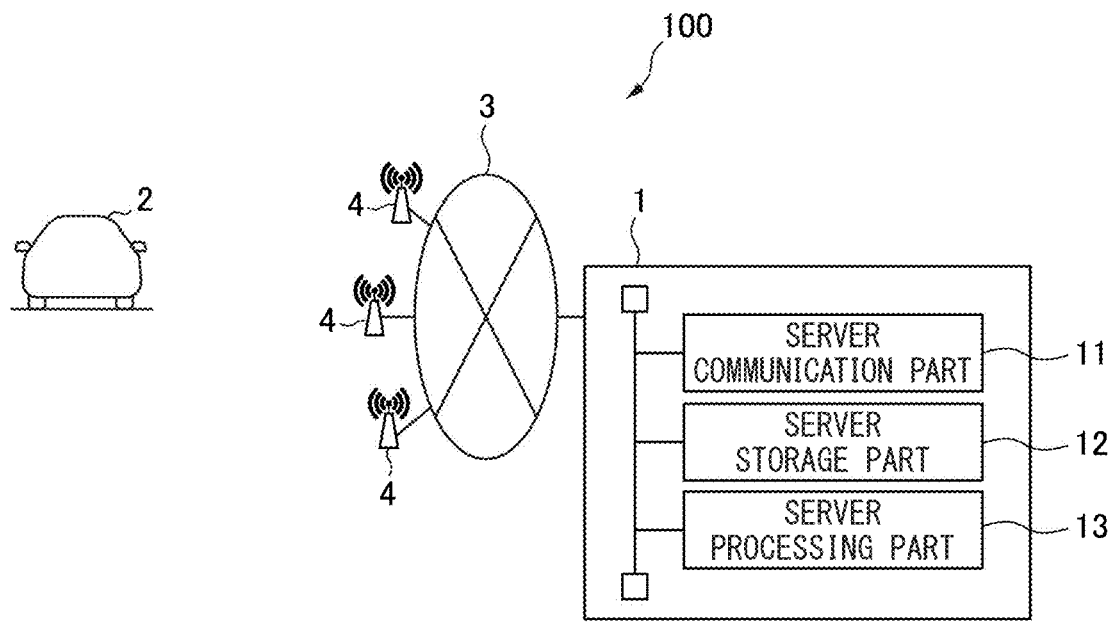
FIG. 1 is a schematic view of the configuration of a vehicle control system according to one embodiment of the present disclosure.

Below, referring to the drawings, embodiments of the present disclosure will be explained in detail. Note that, in the following explanation, similar component elements are assigned the same reference notations.

FIG. 1 is a schematic view of the configuration of a vehicle control system 100 according to one embodiment of the present disclosure.

As shown in FIG. 1, the vehicle control system 100 according to the present embodiment is provided with a server 1 and a hybrid vehicle 2.

The server 1 is provided with a server communicating part 11, server storage part 12, and server processing part 13.

The server communicating part 11 has a communication interface circuit for connecting the server 1 through for example a gateway etc. with a network 3 and is configured to enable mutual communication with the hybrid vehicle 2.

The server storage part 12 has an HDD (hard disk drive) or optical recording medium, semiconductor memory, or other storage medium and stores various computer programs and data etc. used for processing at the server processing part 13.

In the present embodiment, the server storage part 12 stores at least information relating to restricted zones established at different places around the country (information relating to later explained geofences GF and restricted time periods etc.) A "restricted zone" is a zone in which operation of an internal combustion engine is restricted from the viewpoint of preventing air pollution, preventing noise, etc.

Figure 2:
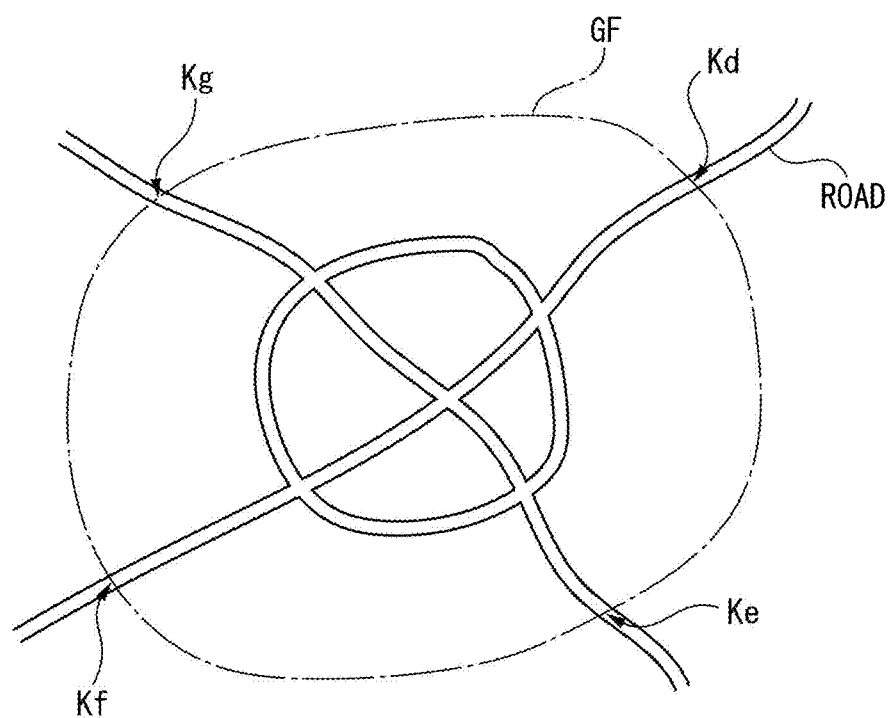
FIG. 2 is a view explaining a restricted region.

Briefly explaining a restricted region referring to FIG. 2, FIG. 2 shows a boundary GF between an inside and an outside of a restricted region and road positions Kd, Ke, Kf, and Kg positioned on the boundary GF. In FIG. 2, the inside of the boundary GF is the restricted region. If this restricted region is, for example, a restricted region of a variable time period type provided for only a predetermined restricted time period, operation of internal combustion engines inside the restricted region is restricted for exactly the restricted time period and operation of internal combustion engines is allowed in a nonrestricted time period. The restricted time period is, for example, set in units of hours or days, weeks, months, years, days of the week, etc.

Returning to FIG. 1, the server processing part 13 has one or more processors and their peripheral circuits. The server processing part 13 runs various computer programs stored in the server storage part 12 and comprehensively controls the overall operation of the server 1. For example, it is a CPU (central processing unit).

Figure 3:
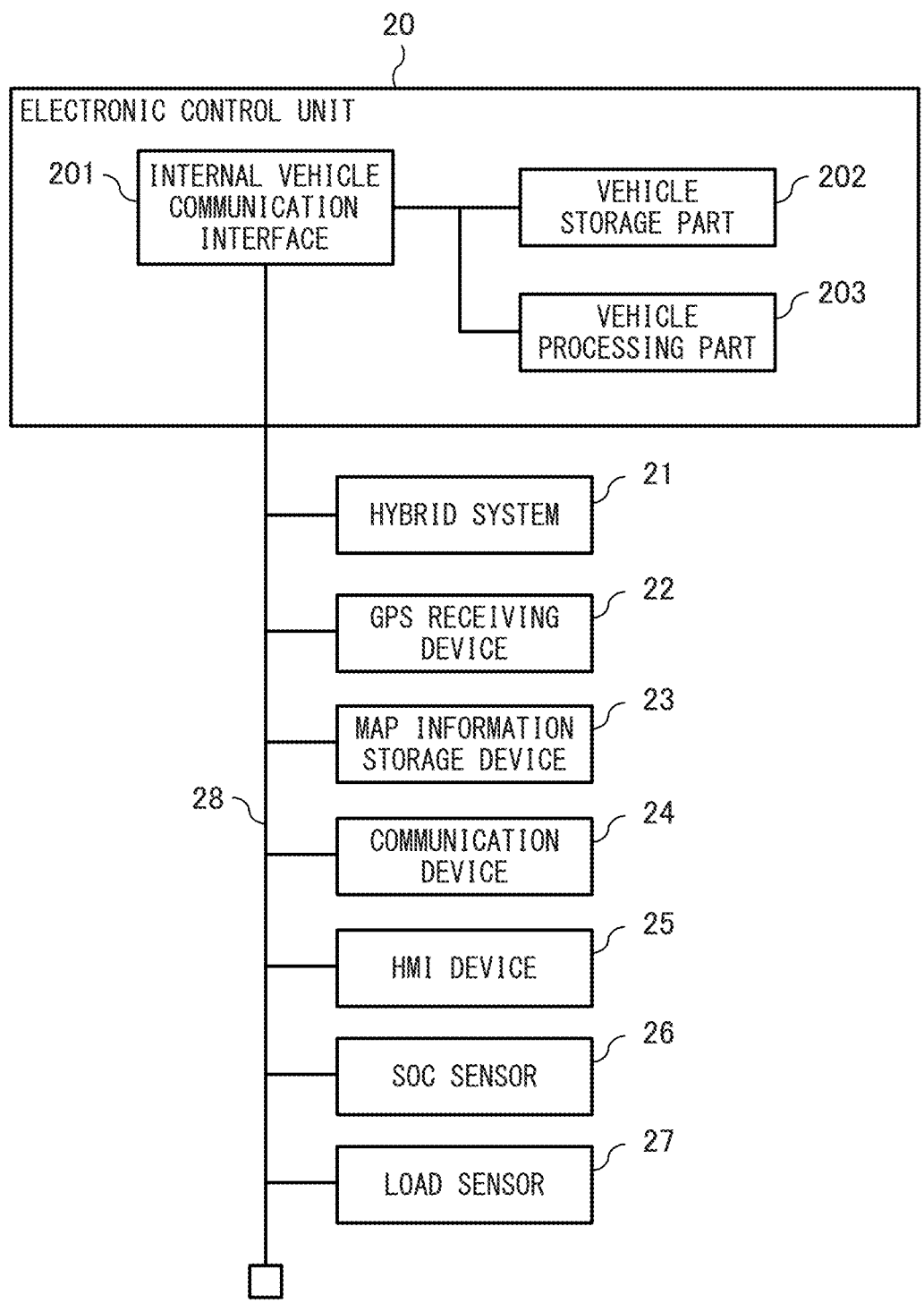
FIG. 3 is a schematic view of the configuration of a hybrid vehicle according to one embodiment of the present disclosure.

FIG. 3 is a schematic view of the configuration of a hybrid vehicle 2.

As shown in FIG. 3, the hybrid vehicle 2 is provided with an electronic control unit 20, hybrid system 21, GPS receiving device 22, map information storage device 23, communication device 24, HMI (human machine interface) device 25, and an SOC sensor 26 or load sensor 27 or other various types of sensors. The hybrid system 21, GPS receiving device 22, map information storage device 23, communication device 24, HMI device 25, and various types of sensors are connected through an internal vehicle network 28 based on the CAN (Controller Area Network) or other standard with the electronic control unit 20.

The hybrid system 21 is configured to be able to generate the power required for making the hybrid vehicle 2 run and to transmit the power to the drive wheels. Details of the hybrid system 21 will be explained referring to FIG. 4.

Figure 4:
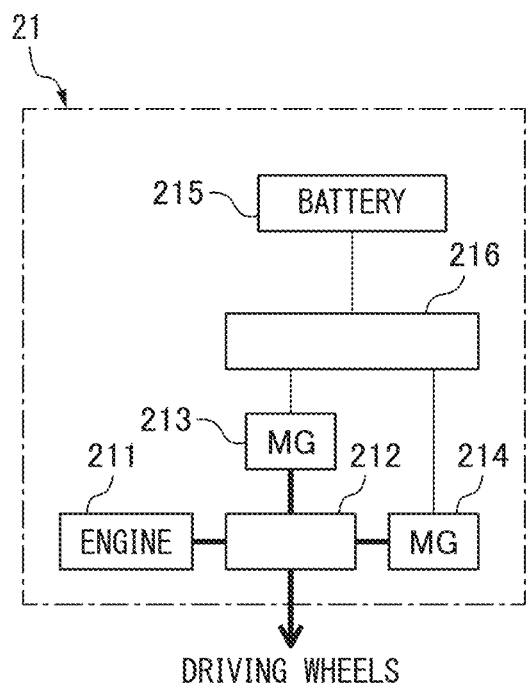
FIG. 4 is a schematic view of the configuration of a hybrid system according to one embodiment of the present disclosure.

FIG. 4 is a schematic view of the configuration of the hybrid system 21 according to the present embodiment. The hybrid system 21 according to the present embodiment is a so-called series-parallel type of hybrid system, but may also a series type or parallel type or other type of hybrid system.

As shown in FIG. 4, the hybrid system 21 according to the present embodiment is provided with an internal combustion engine 211, a power split mechanism 212, a first rotating electrical machine 213 mainly used as a generator, a second rotating electrical machine 214 mainly used as a motor, a battery 215, and a power control unit (below, referred to as a "PCU") 216.

The internal combustion engine 211 makes fuel burn inside cylinders formed inside it so as to make an engine output shaft coupled with the power split mechanism 212 rotate.

The power split mechanism 212 is a known planetary gear mechanism for splitting the power of the internal combustion engine 211 into two systems of power for making the drive wheels turn and power for driving regenerative operation of the first rotating electrical machine 213.

The first rotating electrical machine 213 is, for example, a three-phase AC synchronous type of motor-generator and has a function as a motor receiving the supply of electric power from the battery 215 to drive powered operation and a function as a generator receiving power of the internal combustion engine 211 to drive regenerative operation. In the present embodiment, the first rotating electrical machine 213 is mainly used as a generator and generates the electric power required for charging the battery 215 and the electric power required for driving powered operation of the second rotating electrical machine 214. Further, it is used as a motor when cranking to make the engine output shaft turn at the time of start of the internal combustion engine 211 and performs the role of a starter.

The second rotating electrical machine 214 is, for example, a three-phase AC synchronous type of motor-generator and has a function as a motor receiving the supply of electric power from the battery 215 to drive powered operation and a function as a generator receiving power from the drive wheels at the time of deceleration of the hybrid vehicle 2 to drive regenerative operation. In the present embodiment, the second rotating electrical machine 214 is mainly used as a motor and generates power for making the drive wheels rotate.

The battery 215 is, for example, a nickel-cadmium storage battery or nickel-hydrogen storage battery, lithium ion battery, or other rechargeable secondary battery. Note that the battery 215, for example, may also be configured to be able to be electrically connected with an external power source so that charging from a household outlet or other external power source becomes possible.

The PCU 216 is provided with an inverter (not shown) and a boost converter (not shown). Its operation is controlled by the electronic control unit 20. Specifically, when using the rotating electrical machines 213, 214 as motors, the operation of the PCU 216 is controlled by the electronic control unit 20 so that the electric power required for driving the rotating electrical machines 213, 214 is supplied from the battery 215 to the rotating electrical machines 213, 214. Further, when using the rotating electrical machines 213, 214 as generators, the operation of the PCU 216 is controlled by the electronic control unit 20 so that the electric power generated at the rotating electrical machines 213, 214 is supplied to the battery 215.

Returning to FIG. 3, the GPS receiving device 22 receives radio waves from artificial satellites to identify the longitude and latitude of the hybrid vehicle 2 and detect the current position of the hybrid vehicle 2.

The map information storage device 23 stores position information of roads and information on the shapes of roads (for example, grades, types such as curves or straight parts, curvature of curves, etc.), position information of intersections and turnoffs, road types, speed limits, and other various road information.

The communication device 24 is a vehicle-mounted terminal having a wireless communication function. The communication device 24 accesses a wireless base station 4 (see FIG. 1) connected through a not shown gateway etc. to thereby be connected through the wireless base station 4 with the network 3. Due to this, it communicates with the server 1.

The HMI device 25 is an interface for transfer of information with the vehicle occupants. The HMI device 25 according to the present embodiment is provided with a display or speaker for providing various types of information to the vehicle occupants and a touch panel (or control panel) for the vehicle occupants to operate to enter information. The information entered by the vehicle occupants (for example the destination etc.) is transmitted to the electronic control unit 20.

The SOC sensor 26 detects the state of charge SOC of the battery 215 (below, referred to as the "battery state of charge").

The load sensor 27 detects the output voltage, which is proportional to the amount of depression of the accelerator pedal, as a parameter corresponding to the driving load.

The electronic control unit 20 is provided with an internal vehicle communication interface 201, vehicle storage part 202, and vehicle processing part 203. The internal vehicle communication interface 201, vehicle storage part 202, and vehicle processing part 203 are connected with each other through signal wires.

The internal vehicle communication interface 201 is a communication interface circuit for connecting the electronic control unit 20 to the internal vehicle network 28 based on the CAN (Controller Area Network) or another standard.

The vehicle storage part 202 has an HDD (hard disk drive) or optical recording medium, semiconductor memory, or other storage medium and stores various computer programs and data used for processing at the vehicle processing part 203 etc.

The vehicle processing part 203 has one or more processors and their peripheral circuits. The vehicle processing part 203 runs various computer programs stored in the vehicle storage part 202 to comprehensively control the hybrid vehicle 2. For example, it is a CPU. Below, the content of the control of the hybrid vehicle 2 performed by the vehicle processing part 203 and in turn the electronic control unit 20 will be explained.

The electronic control unit 20 switches a running mode to either of an EV (electric vehicle) mode or HV (hybrid vehicle) mode to run the hybrid vehicle 2, based on the battery state of charge SOC. Specifically, if the battery state of charge SOC is greater than or equal to a mode switching state of charge SOC1, the electronic control unit 20 sets the running mode of the hybrid vehicle 2 to the EV mode, while if the battery state of charge SOC is less than the mode switching state of charge SOC1, it sets the running mode of the hybrid vehicle 2 to the HV mode. Note that the EV mode is sometimes also called a "CD (charge depleting) mode", while the HV mode is sometimes also called a "CS (charge sustaining) mode".

The EV mode is a mode utilizing the electric power of the battery 215 on a preferential basis to drive powered operation of the second rotating electrical machine 214 and transmitting the power of the second rotating electrical machine 214 to the drive wheels to make the hybrid vehicle 2 run.

When the running mode of the electronic control unit 20 is the EV mode, the internal combustion engine 211 is made to stop and in that state the electric power of the battery 215 is utilized to drive powered operation of the second rotating electrical machine 214. Only the power of the second rotating electrical machine 214 is used to make the drive wheels rotate and make the hybrid vehicle 2 run. That is, when the running mode is the EV mode, the electronic control unit 20 makes the internal combustion engine 211 stop and in that state controls the output of the second rotating electrical machine 214 based on the running load to make the hybrid vehicle 2 run so as to obtain the demanded output corresponding to the running load.

The HV mode is a mode controlling the outputs of the internal combustion engine 211 and the second rotating electrical machine 214 to make the hybrid vehicle 2 run so that the battery state of charge SOC is maintained at the state of charge when switched to the HV mode (below, referred to as the "maintained state of charge").

Figure 5:
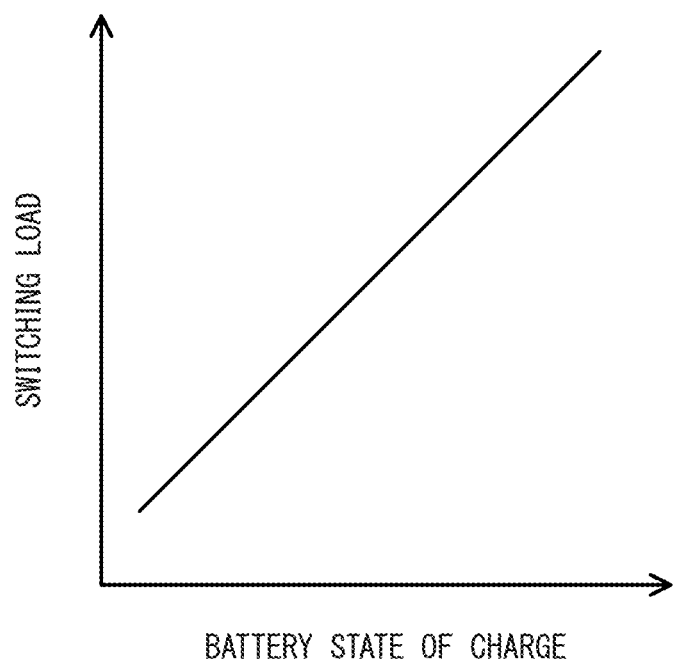
FIG. 5 is a view showing a relationship between a state of charge of a battery and a switching load.

When the running mode is the HV mode, if the running load is less than a predetermined switching load, in the same way as the above-mentioned EV mode, the electronic control unit 20 makes the internal combustion engine 211 stop and in that state uses the electric power of the battery 215 to drive powered operation of the second rotating electrical machine 214 and uses only the power of the second rotating electrical machine 214 to make the drive wheels rotate and make the hybrid vehicle 2 run. Note that, the electronic control unit 20, as shown in FIG. 5, makes the switching load change in accordance with the battery state of charge SOC so that the switching load becomes smaller the smaller the battery state of charge SOC.

Further, when the running mode is the HV mode, if the running load is greater than or equal to the predetermined switching load, the electronic control unit 20 splits the power of the internal combustion engine 211 by the power split mechanism 212 into two systems, transmits one part of the split power of the internal combustion engine 211 to the drive wheels, and uses the other part of the power to drive regenerative operation of the first rotating electrical machine 213. Further, basically, the electric power generated by the first rotating electrical machine 213 is used to drive powered operation of the second rotating electrical machine 214 while supplying part of that electric power to the battery in accordance with need to charge the battery and transmits the power of the second rotating electrical machine 214 to the drive wheels in addition to part of the power of the internal combustion engine 211 to make the hybrid vehicle 2 run.

Further, if the running mode is the HV mode, when the battery state of charge SOC becomes less than the maintained state of charge when the vehicle is stopped, the electronic control unit 20 uses the power of the internal combustion engine 211 to drive regenerative operation of the first rotating electrical machine 213 and uses the electric power generated by the first rotating electrical machine 213 to charge the battery so that the battery state of charge SOC becomes greater than or equal to the maintained state of charge.

In this way, when the running mode is the HV mode, the electronic control unit 20 controls the outputs of the internal combustion engine 211 and the second rotating electrical machine 214 to make the hybrid vehicle 2 run based on the battery state of charge SOC and the running load so that they become the demanded outputs corresponding to the running load. When the running mode switches from the EV mode to the HV mode, if the running load becomes high, the internal combustion engine 211 is started. For this reason, the HV mode is basically predicated on making the internal combustion engine 211 operate and can be said to be a running mode designed to enable the hybrid vehicle 2 to be driven by only the output of the second rotating electrical machine 214 under conditions of a poor thermal efficiency of the internal combustion engine 211.

In this way, in the present embodiment, during the EV mode, the electric power of the battery 215 is consumed to make the hybrid vehicle 2 run until the battery state of charge SOC becomes the mode switching state of charge SOC1. Further, during the HV mode, in accordance with need, electric power generated utilizing the power of the internal combustion engine 211 is charged to the battery 215 while the hybrid vehicle 2 is being run so that the battery state of charge SOC is maintained at the mode switching state of charge SOC1. That is, in the present embodiment, the internal combustion engine 211 and the rotating electrical machines 213, 214 and the charging and discharging of the battery 215 are controlled and the hybrid vehicle 2 run so that the battery state of charge SOC becomes the mode switching state of charge SOC1. Therefore, the mode switching state of charge SOC1 according to the present embodiment can also be called the "target state of charge of the battery 215" during running of the hybrid vehicle 2.

Here, as explained above, the HV mode basically is a driving mode predicated on operation of the internal combustion engine 211. Basically the internal combustion engine 211 is started after the driving mode is switched from the EV mode to the HV mode. Further, the EV mode is switched to the HV mode depending on the battery state of charge SOC. In the present embodiment, the driving mode is switched from the EV mode to the HV mode when the battery state of charge SOC becomes the mode switching state of charge SOC1. Further, to improve the fuel efficiency, the mode switching state of charge SOC1 is, for example, set to a relatively low first state of charge (for example, 10% of the full state of charge etc.) and the vehicle is desirably run in the EV mode.

However, in recent years, sometimes restricted regions explained above with reference to FIG. 2 are provided at numerous locations. If ending up performing control for switching the driving mode while setting the mode switching state of charge SOC1 at a low value without considering the presence of such restricted regions, for example, it is liable to become necessary to enter a restricted region in a restricted time period in a state with the battery state of charge SOC fallen and running in the HV mode, that is, in a state where the battery state of charge SOC is not sufficiently secured. Further, for example, a nonrestricted time period is liable to switch to a restricted time period when running inside a restricted region in a state where the battery state of charge SOC is not sufficiently secured.

Inside a restricted region during a restricted time period, operation of the internal combustion engine 211 is restricted, so it is necessary to run in the EV mode even in a state where the battery state of charge SOC is not sufficiently secured and the internal combustion engine 211 cannot be operated to charge the battery 215. For this reason, in the worst case, the vehicle is liable to become unable to be run due to the electric power running out.

On the other hand, if maintaining the battery state of charge SOC of the hybrid vehicle 2 at a relatively high value at all times while considering running through a restricted region during a restricted time period, the distance able to be run in the EV mode ends up decreasing, so the fuel efficiency is liable to deteriorate.

Therefore, in the present embodiment, if the destination or any point on the way up to the destination (below, referred to as a "waypoint") is positioned inside a restricted region, it was decided to set the mode switching state of charge SOC1 (that is, the target state of charge) based on an estimated time of arrival at the destination or waypoint and information relating to the restricted time period of the restricted region. Specifically, if the destination or waypoint is positioned inside a restricted region, when the estimated time of arrival at the destination or waypoint is a point of time outside the restricted time period when operation of internal combustion engine in the restricted region is restricted, the mode switching state of charge SOC1 was set to a lower value than when the estimated time of arrival at the destination or waypoint is inside the restricted time period.

Due to this, even when necessary to run inside the restricted region before arriving at the destination, when there is a low possibility of running through that restricted region during the restricted time (that is, if the destination or waypoint is positioned inside the restricted region and the estimated time of arrival at the destination or waypoint is a point of time outside the restricted time period of the restricted region), it is possible to set the mode switching state of charge SOC1 at a relatively low value.

On the other hand, when necessary to run through the inside of the restricted region before arriving at the destination and there is a high possibility of running through the restricted region during the restricted time period (that is, if the destination or waypoint is positioned inside a restricted region and the estimated time of arrival at the destination or waypoint is a point of time inside the restricted time period of the restricted region), it is possible to set the mode switching state of charge SOC1 at a relatively high value.

For this reason, it is possible to keep the battery state of charge SOC of the hybrid vehicle 2 from being maintained at an unnecessarily high value while managing it at a suitable battery state of charge considering the restricted time period of the restricted region, so it is possible to keep the fuel efficiency from deteriorating while keeping the vehicle from becoming unable to run due to the electric power running out even if turning out to run through the restricted region during the restricted time period.

Figure 6:
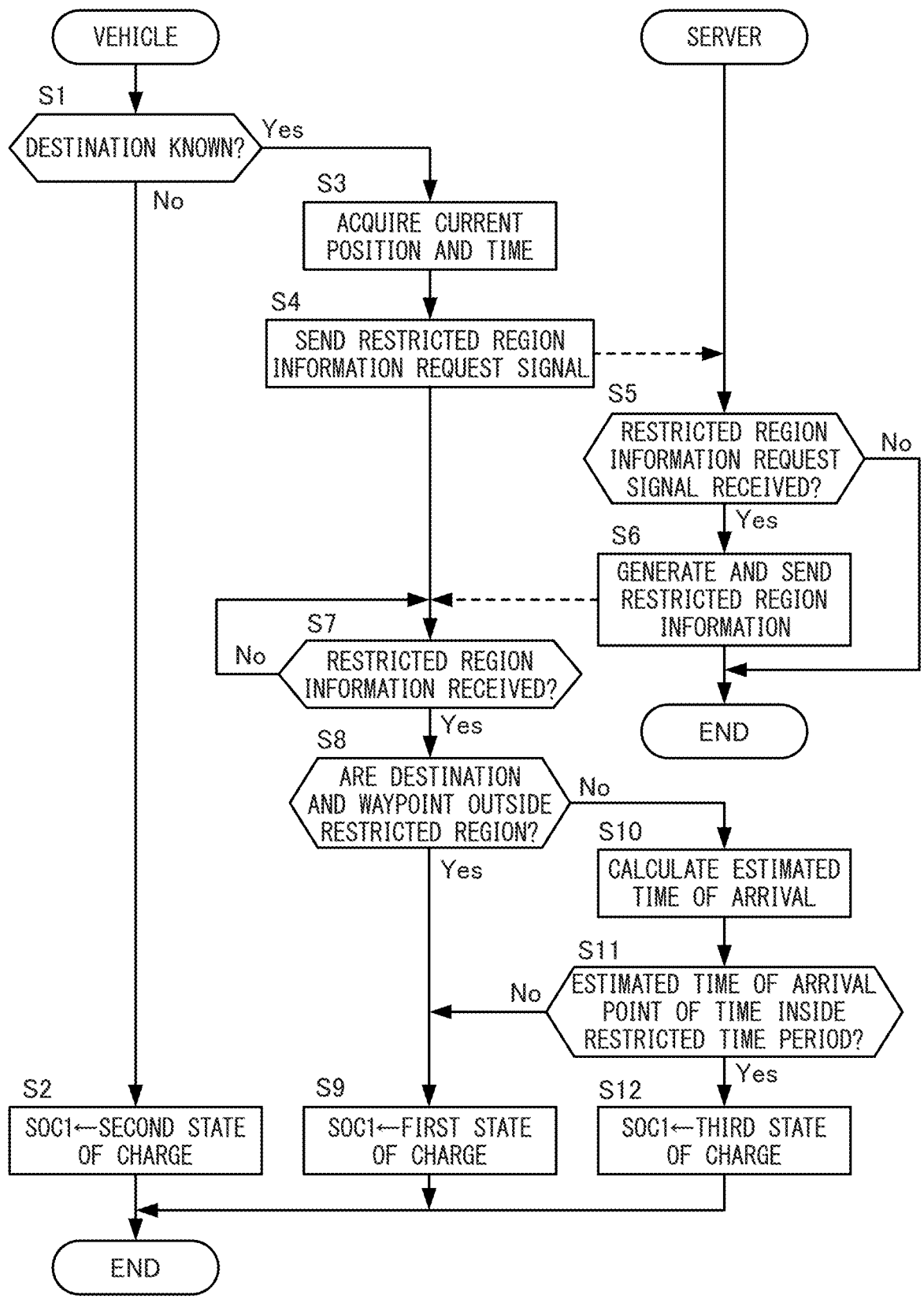
FIG. 6 is a flow chart explaining control for setting a mode switching state of charge according to one embodiment of the present disclosure.

Below, control for setting the mode switching state of charge SOC1 according to the present embodiment will be explained with reference to the flow chart shown in FIG. 6.

At step S1, the electronic control unit 20 of the hybrid vehicle 2 judges if the destination is known. The destination may be a destination entered by vehicle occupants through the HMI device 25 or may be a destination surmised from the past driving history etc. If the destination is not known, the electronic control unit 20 proceeds to the processing of step S2. On the other hand, if the destination is known, the electronic control unit 20 proceeds to the processing of step S3.

At step S2, the destination and in turn the future driving route are unknown and, therefore, a possibility remains of running through a restricted region during a restricted time period, while if the mode switching state of charge SOC1 is set to too high a value, this becomes a cause of deterioration of the fuel economy, so the electronic control unit 20 of the hybrid vehicle 2 sets the mode switching state of charge SOC1 to a predetermined second state of charge somewhat larger than the above-mentioned first state of charge.

Due to this, if the destination is unknown, it is possible to secure a certain extent of battery state of charge even if turning out to drive through a restricted region in a restricted time period. Further, the mode switching state of charge SOC1 is not set to an unnecessarily high value, so it is possible to keep down deterioration of the fuel efficiency while keeping from becoming unable to run due to the electric power running out.

At step S3, the electronic control unit 20 of the hybrid vehicle 2 acquires the current position of the hybrid vehicle 2 based on position information received from the GPS receiving device 22. Further, the electronic control unit 20 has a clock function (real time clock) and acquires the current time (date and time) measured by the clock function.

At step S4, the electronic control unit 20 of the hybrid vehicle 2 sends to the server 1 a restricted region information request signal including an identification number of the host vehicle (for example, vehicle license plate number), destination, and route from the current position to the destination so as to acquire restricted region information. The restricted region information is information relating to whether the destination or waypoint (any point on route up to the destination) is present inside a restricted region, information relating to the boundary GF of the restricted region or the restricted time period if the destination or waypoint is present inside a restricted region, etc.

At step S5, the server 1 judges if it has received a restricted region information request signal. The server 1 proceeds to the processing of step S6 if receiving a restricted region information request signal. On the other hand, the server 1 ends the current processing if not receiving a restricted region information request signal.

At step S6, the server 1 generates the restricted region information and sends it to the hybrid vehicle 2 of the source of transmission of the restricted region information request signal (below, also referred to in accordance with need as the "sending vehicle 2").

Specifically, the server 1 first judges if the destination or waypoint of the sending vehicle 2 is present inside a restricted region based on the information relating to restricted regions stored in the server storage part 12 and the destination and waypoint of the sending vehicle 2. Further, if either of the destination and waypoint of the sending vehicle 2 is not present inside a restricted region, the server 1 generates restricted region information including information to that effect and sends it to the sending vehicle 2. On the other hand, if at least one of the destination or waypoint of the sending vehicle 2 is present inside a restricted region, the server 1 generates restricted region information including information relating to the boundary GF of the restricted region and the restricted time period and sends it to the sending vehicle 2. Note that waypoints, for example, may be set at constant intervals on the route up to the destination. If information relating to a waypoint is entered through the HMI device 25 by vehicle occupants, information relating to the waypoint may be included in the restricted region information request signal to be grasped.

At step S7, the electronic control unit 20 of the hybrid vehicle 2 judges if it has received the restricted region information. If receiving the restricted region information, the electronic control unit 20 proceeds to the processing of step S8. On the other hand, if not receiving the restricted region information, the electronic control unit 20 again judges if it has received the restricted region information after waiting a certain time At step S8, the electronic control unit 20 of the hybrid vehicle 2 refers to the restricted region information and if both of the destination and waypoint of the host vehicle are not present inside a restricted region, proceeds to the processing of step S9. On the other hand, if at least one of the destination or waypoint of the host vehicle is inside a restricted region, the electronic control unit 20 proceeds to the processing of step S10.

At step S9, since both of the destination and waypoint are not present inside a restricted region and therefore there is a low possibility of running inside a restricted region during a restricted time period before arriving at the destination and there is no problem if securing the lowest limit state of charge of the battery state of charge SOC, the electronic control unit 20 of the hybrid vehicle 2 sets the mode switching state of charge SOC1 to the above-mentioned first state of charge for improving the fuel efficiency. The first state of charge, as explained above, is made a relatively low value for improving the fuel efficiency. In the present embodiment, it is made a value of 10% or so of the full state of charge.

Due to this, if there is a low possibility of running inside a restricted region during a restricted time period before arriving at the destination, it is possible to set the mode switching state of charge SOC1 to a relatively low value, so it is possible to increase the distance able to be run in the EV mode and improve the fuel efficiency.

At step S10, if a waypoint is present inside a restricted region, the electronic control unit 20 of the hybrid vehicle 2 calculates the estimated time of arrival at the waypoint and, if the destination is present inside a restricted region, calculates the estimated time of arrival at the destination.

At step S11, if the waypoint is present inside a restricted region, the electronic control unit 20 of the hybrid vehicle 2 judges if the estimated time of arrival at the waypoint is a point of time inside a restricted time period in which operation of the internal combustion engine is restricted in the restricted region in which the waypoint is present. Further, if the destination is present inside a restricted region, the electronic control unit 20 judges if the estimated time of arrival at the destination is a point of time inside a restricted time period in which operation of the internal combustion engine is restricted in the restricted region in which the destination is present.

If the estimated time of arrival at the waypoint or destination present inside the restricted region is a point of time inside a restricted time period of the restricted region, that is, if there is a high possibility of running through the restricted region during a restricted time period before arriving at the destination, the electronic control unit 20 proceeds to the processing of step S12. On the other hand, if the estimated time of arrival at the waypoint and the estimated time of arrival at the destination are points of time outside a restricted time period of the restricted region, that is, if the vehicle will be running inside the restricted region before arriving at the destination, but there is a low possibility of it running through the inside of the restricted region during a restricted time period, the electronic control unit 20 proceeds to the processing of step S9.

At step S12, there is a high possibility of running inside the restricted region during a restricted time period before arriving at the destination, so the electronic control unit 20 sets the mode switching state of charge SOC1 to a predetermined third state of charge larger than the first state of charge and the second state of charge so as to keep the vehicle from becoming unable to run due to the electric power running out.

Due to this, if there is a high possibility of running inside a restricted region during a restricted time period before arriving at the destination, it is possible to set the mode switching state of charge SOC1 at a relatively high value, so even if running inside a restricted region during a restricted time period, it is possible to keep the vehicle from becoming unable to run due to the electric power running out.

Note that in the present embodiment, the third state of charge is made a fixed value, but the third state of charge may also be made a variable value. If making the third state of charge a variable value, for example, the third state of charge can be set based on the remaining distance or required time from the current position to the restricted region and the grace period from the current time to the starting time of the restricted time period with reference to the map shown in FIG. 7 prepared in advance by experiments etc. As shown in the map of FIG. 7, the shorter the remaining distance or required time period, further, the shorter the grace period, the higher the value the third state of charge is set to. This is because it is considered that the closer to the restricted region, further, the shorter the grace period, the higher the possibility of running in a restricted region during the restricted time period and the more necessary it is to set the third state of charge and in turn the mode switching state of charge SOC1 to a high value and maintain the battery state of charge SOC at a high value.

Note that, the remaining distance or required time period from the current position of the hybrid vehicle 2 to the restricted region, for example, the distance or required time from the current position to each road position Kd, Ke, Kf, Kg positioned on the boundary GF of the restricted region (see FIG. 2) is calculated. The shortest distance or required time among these can be calculated as the remaining distance or required time from the current position to the restricted region. Further, when the current position of the hybrid vehicle 2 is inside the restricted region, the remaining distance or the required time period may be set to zero.

The hybrid vehicle 2 according to the present embodiment explained above is provided with an internal combustion engine 211, a battery 215 storing electric power generated utilizing the drive power of the internal combustion engine 211, and a second rotating electric machine 214 (rotating electric machine) driven by the supply of one or both of the electric power generated utilizing the drive power of the internal combustion engine 211 or the electric power stored in the battery 215. The electronic control unit 20 (control device) for control of this hybrid vehicle 2 is provided with a target charge setting part setting a mode switching state of charge SOC1 corresponding to a target state of charge of the battery 215 and a driving control part making the hybrid vehicle 2 run by controlling the internal combustion engine 211 and the second rotating electric machine 214 and the charging and discharging of the battery 215 so that the battery state of charge SOC becomes the mode switching state of charge SOC1.

Further, the target charge setting part is configured so that if a point inside a restricted region in which operation of the internal combustion engine 211 is restricted is set as the destination or waypoint, when the estimated time of arrival at the destination or waypoint is a point of time outside of the restricted time period when the operation of the internal combustion engine 211 is restricted in the restricted region, it is possible to set the mode switching state of charge SOC1 to a lower value compared with when the estimated time of arrival is a point of time inside the restricted time period.

Due to this, even if having to run inside a restricted region before arriving at the destination, when there is a low possibility of running through that restricted region inside a restricted time period (that is, if the destination or waypoint is positioned inside the restricted region and the estimated time of arrival at the destination or waypoint is a point of time outside the restricted time period of the restricted region), it is possible to set the mode switching state of charge SOC1 to a relatively low value. For this reason, it is possible to increase the distance able to be run in the EV mode and improve the fuel efficiency.

On the other hand, when necessary to run inside a restricted region before arriving at the destination and there is a high possibility of running through the restricted region during a restricted time period (that is, if the destination or waypoint is positioned inside the restricted region and the estimated time of arrival at the destination or waypoint is a point of time inside the restricted time period of the restricted region), it is possible to set the mode switching state of charge SOC1 to a relatively high value. For this reason, even if turning out to run inside the restricted region during the restricted time period, it is possible to keep a vehicle from becoming unable to run due to the electric power running out.

In this way, according to the present embodiment, it is possible to keep the battery state of charge SOC of the hybrid vehicle 2 from being maintained at an unnecessarily high value while managing the battery state of charge SOC at a suitable state of charge considering a restricted time period of a restricted region. Therefore, it is possible to keep the fuel efficiency from deteriorating while keeping a vehicle from becoming unable to run due to the electric power running out even if turning out to run through a restricted region during a restricted time period.

Note that the mode switching state of charge SOC1 may also be set based on the remaining distance or required time from the current position to a restricted region and a grace period from the current time until a point of time when the restriction on operation of the internal combustion engine 211 is started in a restricted region in a case where a point inside a restricted region is set as the destination or waypoint and the estimated time of arrival at the destination or waypoint is a point of time inside a restricted time period.

Due to this, the closer to the restricted region and, further, the shorter the grace period, the higher the value the mode switching state of charge SOC1 can be set to and the higher the value the battery state of charge SOC can be maintained at. That is, the higher the possibility of running in a restricted region during a restricted time period, the higher the value the target state of charge of the battery 215 can be set to and the higher the value the battery state of charge SOC can be maintained at. For this reason, it is possible to keep a vehicle from having to run in a restricted region during a restricted time period in a state where the battery state of charge SOC cannot be sufficiently secured.

Above, embodiments of the present disclosure were explained, but the above embodiments only show some of the examples of application of the present disclosure and are not meant to restrict the technical scope of the present disclosure to the specific constitutions of the embodiments.

For example, in the above embodiments, the restricted region information was acquired from the server 1, but the disclosure is not limited to this. It is also possible to store restricted region information in advance in the vehicle storage part 202 of the electronic control unit 20 or another vehicle mounted storage device or possible to acquire the restricted region information sent from a road traffic information communication system center or other outside communication center by receiving it when the outside communication center periodically sends restricted region information. In this case, communication with the server 1 becomes unnecessary.

The invention claimed is:

1. A control device for a hybrid vehicle, wherein
the hybrid vehicle comprises:
   an internal combustion engine;
   a battery storing electric power generated utilizing drive power of the internal combustion engine; and
   a rotating electric machine driven by supply of one or both of electric power generated using the drive power of the internal combustion engine and the electric power stored in the battery, and
the control device comprises a processor configured to:
   set a target state of charge of the battery;
   control the internal combustion engine, the rotating electric machine and charging and discharging of the battery to make the hybrid vehicle run and to cause a state of charge of the battery to become the target state of charge, wherein the target state of charge is a mode switching state of charge, the mode switching state of charge being a threshold value of the state of charge of the battery to switch between a hybrid vehicle mode and an electric vehicle mode; and
   in response to a point inside a restricted region where operation of the internal combustion engine is restricted being set as a destination or a waypoint, set the target state of charge to a lower value when an estimated time of arrival at the destination or the waypoint is outside a restricted time period when operation of the internal combustion engine is restricted in the restricted region than when the estimated time of arrival is inside the restricted time period.

2. The control device according to claim 1, wherein
in response to the point inside the restricted region being set as the destination or the waypoint and the estimated time of arrival being inside the restricted time period, the processor is configured to set the target state of charge based on (i) a remaining distance or required time period from a current position to the restricted region and (ii) a grace period from a current time to a point of time when restriction of operation of the internal combustion engine is started in the restricted region.

3. A control method for a hybrid vehicle, wherein
the hybrid vehicle comprises:
   an internal combustion engine;
   a battery storing electric power generated utilizing drive power of the internal combustion engine; and
   a rotating electric machine driven by supply of one or both of the electric power generated using the drive power of the internal combustion engine and the electric power stored in the battery, and
the control method comprises:
   in response to a point inside a restricted region where operation of the internal combustion engine is restricted being set as a destination or a waypoint, setting a target state of charge to a lower value when an estimated time of arrival at the destination or the waypoint is a point of time outside a restricted time period where operation of the internal combustion engine is restricted in the restricted region than when the estimated time of arrival is a point of time inside the restricted time period; and
   controlling the internal combustion engine the rotating electric machine and charging and discharging of the battery to make the hybrid vehicle run and to cause a state of charge of the battery to become the target state of charge, wherein the target state of charge is a mode switching state of charge, the mode switching state of charge being a threshold value of the state of charge of the battery to switch between a hybrid vehicle mode and an electric vehicle mode.

4. The control device according to claim 1, wherein the processor is configured to,
   in response to the point inside the restricted region where operation of the internal combustion engine is restricted being set as the destination or the waypoint,
      change the target state of charge to a first state of charge when the estimated time of arrival at the destination or the waypoint is outside the restricted time period when the operation of the internal combustion engine is restricted in the restricted region, the first state of charge corresponding to the lower value of the target state of charge.

5. The control device according to claim 4, wherein the processor is configured to,
   in response to determining the destination being unknown, change the target state of charge to a second state of charge higher than the first state of charge.

6. The control device according to claim 5, wherein the processor is configured to,
   in response to the point inside the restricted region where operation of the internal combustion engine is restricted being set as the destination or the waypoint,
      change the target state of charge to a third state of charge when the estimated time of arrival at the destination or the waypoint is inside the restricted time period, the third state of charge being higher than the second state of charge.

7. The control device according to claim 4, wherein the first state of charge is 10% of a full state of charge of the battery.

8. The control device according to claim 1, wherein
   the electric vehicle mode is a mode utilizing the electric power stored in the battery on a preferential basis to drive powered operation of the rotating electrical machine to make the hybrid vehicle run, and
   the hybrid vehicle mode is a mode controlling an output of the internal combustion engine and the rotating electrical machine to make the hybrid vehicle run.

9. The control device according to claim 1, wherein the processor of the control device is configured to,
   in response to the state of charge of the battery being greater than or equal to the mode switching state of charge, switch a running mode of the hybrid vehicle to the electric vehicle mode, and
   in response to the state of charge of the battery being less than the mode switching state of charge, switch the running mode of the hybrid vehicle to the hybrid vehicle mode.

* * * * *